3,444,244
DINITROPHENYLPROPANOLS HAVING HERBICIDAL PROPERTIES
Peter E. Newallis, Morris Plains, and Edmund J. Rumanowski, Dover, N.J., assignors to Allied Chemical Corporation, New York, N.Y., a corporation of New York
No Drawing. Filed Nov. 15, 1966, Ser. No. 594,417
Int. Cl. C07c *39/04, 35/02, 43/28*
U.S. Cl. 260—613                                   9 Claims

---

ABSTRACT OF THE DISCLOSURE

Herbicidally active dinitrophenyl propanols of the formula

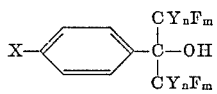

wherein X is a member of the group consisting of Cl, Br, methoxy and hydroxy; Y is a member of the group consisting of hydrogen and chlorine; F is fluorine; $n$ is an integer 0–2 and $m$ is an integer $3-n$.

---

This invention relates to novel dinitrophenylpropanols, more specifically it relates to 2(4-chloro-3,5-dinitrophenyl)-hexafluoropropanol-2 and to similar substituted dinitrophenylpropanols. The invention lies in the discovery of these compounds as new products, and the discovery of herbicidal properties of the same.

The compounds of this invention may be represented by the formula:

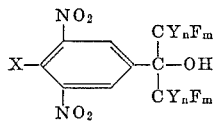

where X is chosen from the group consisting of chlorine, bromine, methoxy and hydroxy; Y is chosen from the group consisting of hydrogen and chlorine; F is fluorine; $n$ is an integer from 0–2 and $m$ is the integer $3-n$.

The compounds which fall within the scope of this invention include:

2(4-chloro-3,3-dinitrophenyl)-hexafluoropropanol-2,
2(4-methoxy-3,5-dinitrophenyl)-hexafluoropropanol-2,
2(4-chloro-3,5-dinitrophenyl)-1,3-dichloro-1,1,3,3-tetrafluoropropanol-2,
2(4-chloro-3,5-dinitrophenyl)-1,1,3,3-tetrafluoropropanol-2,
2(4-hydroxy-3,5-dinitrophenyl)-hexafluoropropanol-2,
2(4-bromo-3,5-dinitrophenyl)-hexafluoropropanol-2.

In accordance with the invention, it has been found that these novel compounds exhibit good herbicidal activity at application rates as low as two pounds per acre.

It is therefore an object of the present invention to provide novel dinitrophenylpropanol compounds.

It is also an object of the present invention to provide a process for the preparation of these dinitrophenyl propanol compounds which is both efficient and economical.

It is a further object of the invention to provide a compound which exhibits excellent herbicidal properties.

Additional objects of this invention will be obvious from the following description thereof.

The compounds of the invention may be produced in large percentage yields by the following synthesis:

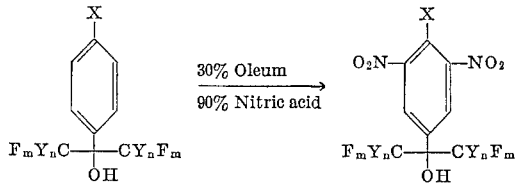

This process thus involves a one-step dinitration at a temperature of about 60 to about 85° C. for about 2½ to 3 hours. During the preparation, the organic starting material is added to the nitrating inorganic acids, and after heating and subsequent cooling, the dinitro compound is filtered off.

An alternative method of preparation of these novel compounds may be illustrated by the following reaction:

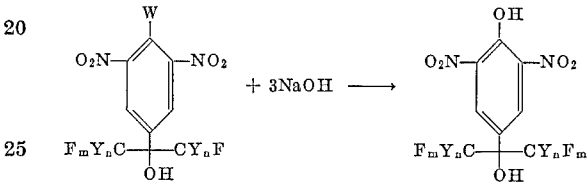

where W is any halogen and Y, F, m, n are as previously defined. In this case, the mixture is refluxed for about 2–4 hours and then made acidic before the product is extracted.

The following examples are illustrative of the novel compounds of this invention and of their preparation:

Example 1

To 600 parts by weight of 30% oleum and 300 parts by weight of 90% nitric acid is added 139 parts by weight of 2(4-chlorophenyl)-hexafluoropropanol-2 at 60–65° C. The mixture is then heated at 80–85° C. for 2½ hours. After cooling to room temperature, the reaction mass is filtered on a glass fritted funnel and the resulting solid is washed three times with 100 ml. water and it is air dried. The solid is then triturated with 200 ml. carbon tetrachloride at room temperature to give 147 grams (80% yield) solid 2(4-chloro-3,5-dinitrophenyl)-hexafluoropropanol-2 with a melting point in the range 111 to 114° C.

Example 2

2(4 - methoxy - 3,5 - dinitrophenyl) - hexafluoropropanol-2 was prepared in a similar manner by adding 60 parts of nitric acid and 120 parts of oleum to 27 parts of 2(4-methoxyphenyl)-hexafluoropropanol-2. The reaction mass was heated at 70–75° C. for 2 hours and after cooling and filtering yielded 11.5 grams of the 2(4-methoxy-3,5-dinitrophenyl)-hexafluoropropanol-2 with melting point in the range 91–92° C.

Example 3

100 parts of 0.25 M sodium hydroxide was added to 15 parts of 2(4-chloro-3,5-dinitrophenyl)-hexafluoropropanol-2 and the reaction mixture was refluxed for 3½ hours and made acidic with concentrated hydrochloric acid. It was then dissolved in dichloromethane extracted, washed and dried with MgSO₄. This process yields 2(4-hydroxy-3,5-dinitrophenyl)-hexafluoropropanol-2.

The organic starting materials used to produce the novel compounds of this invention may be prepared reacting perhaloacetones with aromatic hydrocarbons as discussed in a paper published by B. S. Farah et al., Journal of Organic Chemistry, 30, 998–1003 (1965).

We have discovered that the dinitrophenylpropanols of the present invention have excellent herbicidal properties. Thus, the invention includes a process for inhibiting the growth of or destroying vegetation, which comprises adding thereto, or applying to the locus in which it is growing or is to grow, the aforementioned dinitrophenylpropanols.

These compounds have an additional advantage when used as herbicides since they act as both selective and non-selective herbicides depending upon the time at which they are applied. If the composition is applied as a pre-emergence herbicide, it will attack both monocotyledonous or grassy plants and dicotyledonous or broad-leaf plants. However, when applied as a post-emergence herbicide, the compounds of the invention will attack only the dicotyledonous varities such as smartweed, rape, lamb's quarters, bindweed, horsenettle, Canada thistle, and broad-leaf plantain.

These dinitrophenylpropanols are also useful to provide complementary rapid herbicidal action when used in combination with slower acting herbicides.

The herbicides of the present invention are applied to the area to be treated in an amount sufficient to afford the degree of control of vegetation desired in the given area. The optimum intensity of application of the desired herbicides will depend on such factors as the amount of vegetation in the area, the degree of permanency of plant eradication desired, the types of plants growing in the area, and climatic conditions. Hence, as is well known to those skilled in the art, the rate of application used will depend largely on prevailing local conditions. In most instances, effective control of germinating weed seeds and small weed seedlings may be realized by applying the herbicide at an overall rate greater than 1 pound per acre. Where prolonged non-selective control of established vegetation is desired, dosages greater than about 4 pounds per acre are employed. For selective herbicidal use, the compounds of the invention have been found to be useful in amounts of about 2 pounds per acre.

The herbicidal compositions of the present invention may be applied directly in their solid form if desired. For reasons of economy and to achieve greater uniformity of application, however, it is preferable to incorporate the active ingredients in liquid or solid diluents. Best results are obtained if a liquid in which the herbicide is soluble or dispersible is used as the diluent.

The liquid diluent may be a solvent for the active ingredient or the active ingredient may be dispersed in the liquid diluent. Typical liquid diluents include fuel oils, petroleum naphthas, and the like. The solutions or dispersions should contain the active ingredient in an amount not less than ½ of a pound per 100 gallons of dispersion or solution, the more usual concentrations being in the range of 1 to 2 pounds per 100 gallons of dispersion or solution.

If a solid diluent is to be employed, the diluent may be in finely divided or granular form and may include diatomaceous earth, wood flours and silica gels. In these cases, the dusts may contain as little as about 0.5% by weight of the active ingredient.

Various conventional wetting, dispersing and emulsifying agents may be added to the herbicidal formulations of the type described in order to enhance the wetting effect and to produce improved dispersion of the active ingredient on the vegetation to which it is applied.

Any of the known types of spraying or dusting apparatus may be employed for applying the herbicide to the uniformity of application.

The following illustrates the the herbicidal activity of 2(4-chloro-3-5 dinitrophenyl)-hexafluoropropanol-2, a compound which is representative of the novel compounds of the present invention.

A test plot was covered with monocotyledonous and dicotyledonous plants, as well as crop plants, of established growth. These plants included:

| Monocotyledonous plants | Dicotyledonous plants | Crops |
|---|---|---|
| Rye grass | Smart weed. | Corn. |
| Foxtail. | Rape. | Cotton. |
| Crabgrass. | Lamb's quarters. | Wheat. |
| Nut grass. | Bind weed. | Soybean. |
| Johnson grass. | Horse nettle. | |
| | Canada thistle. | |

A pre-emergence test was performed by treating two flats which had been seeded for one day with 2(4-chloro-3-5 dinitrophenyl)-hexafluoropropanol-2- at a rate equivalent to 16 pounds of active chemical per acre. The treated flats were then placed in the greenhouse, watered by sub-irrigation and held for a 16 day period. Similar tests were performed using amounts of the herbicide equivalent to 4 and to 2 pounds per acre.

These pre-emergence tests showed that 2(4-chloro-3-5 dinitrophenyl)-hexafluoropropanol-2 had excellent weed control of both the grass and broad leaf plants with minimal crop injury.

Eight to ten days after seeding, post-emergence tests were performed by treating two flats in a manner similar to the pre-emergence tests. After a 10 to 12 day observation period, it was found that the 2(4-chloro-3-5 dinitrophenyl)-hexafluoropropanol-2 exhibited excellent weed control and translocating activity when applied to the broadleaf varieties. It was further found that as a post-emergence herbicide, 2(4-chloro-3-5 dinitrophenyl)-hexafluoropropanol had no effect on such monocotyledonous varieties as rye. Thus, for example, at this point of growth, the active ingredient could be applied to a crop of rye and it would destroy all the dicotyledonous plants while leaving the actual crop untouched.

The actual results of these tests are shown in the following table wherein the figures 0–100 represent the percent of plants killed or absent as compared to the untreated check plot.

| | 2(4-chloro-3-5 dinitrophenyl)-hexafluoropropanol-2 (lbs.) | Monocotyledonous | Dicotyledonous |
|---|---|---|---|
| Pre-emergence | 16 | 90 | 100 |
| | 2 | 60 | 95 |
| Post-emergence | 16 | 0 | 80 |
| | 2 | 0 | 50 |

Tests performed on the other compounds of this invention gave similar satisfactory results as to their herbicidal activity.

We claim:
1. Dinitrophenylpropanols having the general formula:

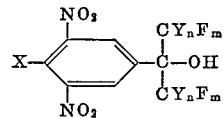

wherein X is a member of the group consisting of chlorine, bromine, methoxy and hydroxy; Y is a member of the group consisting of hydrogen and chlorine; F is fluorine; $n$ is an integer 0–2 and $m$ is an integer $3-n$.

2. Dinitrophenylpropanols as claimed in claim 1 wherein $n$ is 0.

3. Dinitrophenylpropanols as claimed in claim 1 wherein $n$ is 1.

4. 2(4-chloro-3,5-dinitrophenyl)-hexafluoropropanol-2.

5. 2(4-methoxy - 3,5 - dinitrophenyl) - hexafluoropropanol-2.

6. 2(4-chloro-3,5-dinitrophenyl) - 1,3 - dichloro-1,1,3,3-tetrafluoropropanol-2.

7. 2(4-hydroxy - 3,5 - dinitrophenyl) - hexafluoropropanol-2.

8. 2(4-chloro-3,5-dinitrophenyl)-1,1,3,3-tetrafluoropropanol-2.
9. 2(4-bromo-3,5-dinitrophenyl)-hexafluoropropanol-2.

References Cited

UNITED STATES PATENTS

| | | |
|---|---|---|
| 2,426,417 | 8/1947 | Searle. |
| 3,236,894 | 2/1966 | England. |
| 3,304,334 | 2/1967 | Jones. |
| 3,324,185 | 6/1967 | Gilbert et al. |
| 3,355,500 | 11/1967 | Farah et al. |
| 3,356,485 | 12/1967 | Farah et al. |

OTHER REFERENCES

Weichet et al., Chemical Abstracts, Vol. 50 (1956), pp. 16,696–16,697.

Yagupol'skii et al. Chemical Abstracts, Vol. 54 (1960), p. 13,041.

Farah et al., Jour. Org. Chem., Vol. 30 (1965), pp. 998–1001.

BERNARD HELFIN, *Primary Examiner.*

U.S. Cl. X.R.

71—122; 260—618; 622